Patented May 22, 1934

1,959,678

UNITED STATES PATENT OFFICE 1,959,678

VITREOUS ENAMEL FRIT AND METHOD OF PRODUCING SAME

Charles J. Kinzie, Niagara Falls, N. Y., assignor to The Titanium Alloy Manufacturing Company, New York, N. Y., a corporation of Maine No Drawing. Application July 2, 1931,
Serial No. 548,475

6 Claims. (Cl. 106—36.2)

My invention relates more particularly to improved methods for the production of acid resisting enamels by the use of titanium compounds in the raw mix before making the enamel frits or glasses for use in producing acid resisting vitreous enamel coatings on metal.

When titanium oxide and certain other of its compounds in the usual form are incorporated into the raw enamel batch by the usual mixing methods, considerable difficulty is encountered due to the fact that the titanium tends to persist in clots or large aggregates of particles. In the prolonged smelting operation necessary to bring these clots into a proper state of combination, the enamel or glaze is likely to become discolored due to too long contact with heat, and if the enamel to be produced is opaque when using antimony, there is danger of losing part of the antimony opacity due to overheating of the melt.

The objects of my invention are, among other things, to obviate the difficulties described in a simpler and more economical way than has been hitherto attainable by known methods.

I have discovered that if the titanium oxide be mixed with only a part of the other raw materials of the batch, particularly with part of the fusible ingredients, and then this mixture be disintegrated to a fine powder in a suitable machine so as to reduce all aggregates to say a fineness of about 100 mesh or thereabouts, and then if this special mix be mixed with the remainder of the raw materials by the commonly used mixing procedure, the result is an easy smelting titanium enamel charge containing no titanium clots and in which the titanium is enabled to do its maximum work both as a flux in softening the enamel as well as in imparting its maximum effect for acid resisting properties.

Since no one mix would meet all cases, for instance, if the enamel is to be an opaque enamel, the mix might well contain all the titanium as well as the antimony, calcium and fluorine compounds, whereas if the enamel is to be a clear glaze or glass no antimony would be required; as the same holds true of other ingredients, enamel formulæ vary considerably as to range of constituents, and it is to be understood that the two examples given are merely typical of how my invention can be worked with the two enamel formulæ presented, and in no way limit the scope of my invention which may be applied to enamels and glazes of quite different formulæ as compared with those herewith presented.

The following Example A will show how my invention can be practiced in making a white opaque enamel of acid resisting type.

I will first present the complete enamel raw mix formula and its calculated melted composition.

| Raw mix formulæ | | Percentage melted composition | |
|---|---|---|---|
| | Parts by weight | | Percent |
| Sodium zirconium silicate | 7.15 | $Na_2O$ | 16.83 |
| Quartz | 40.97 | $CaF_2$ | 5.94 |
| Borax | 27.33 | $Sb_2O_5$ | 6.94 |
| Sodium carbonate | 17.56 | $B_2O_3$ | 9.90 |
| Sodium nitrate | 3.50 | $SiO_2$ | 42.57 |
| Titanium oxide | 14.00 | $TiO_2$ | 13.86 |
| Antimony oxide | 7.00 | $ZrO_2$ | 3.96 |
| Fluorspar | 6.00 | | |
| | | | 100.00 |
| Raw weight, total | 123.51 | | |
| Theoretical melted weight | 101.00 | | |

The sodium zirconium silicate preferably used in this raw mix has approximately the following composition (B):

| | Percent |
|---|---|
| $ZrO_2$ | 55.36 |
| $SiO_2$ | 29.00 |
| $TiO_2$ | 00.11 |
| $Fe_2O_3$ | 00.10 |
| $Na_2O$ | 14.01 |
| $Al_2O_3$ $P_2O_5$ | 0.77 |
| $CO_2$ | 0.65 |
| | 100.00 |

If the above raw mix formula was simply mixed by the usual method and smelted, the result would be that due to persisting titanium clots too long a time would be required in the smelter and that the resultant enamel would likely be discolored due to effect of too great a heat contact upon the titanium compounds; there would also likely be a substantial loss of antimony opacity.

According to my improved methods I then take the following raw ingredients of the batch.

| | Parts by weight |
|---|---|
| Titanium oxide | 14.0 |
| Quartz | 0.5 |
| Borax | 0.8 |
| Sodium carbonate | 4.0 |
| Sodium nitrate | 1.0 |
| Antimony oxide | 7.0 |
| Fluorspar | 6.0 |
| | 33.3 |

These ingredients are rough mixed in a suitable mixer and are then put through a suitable disintegrating machine to produce a finely milled mixture pulverized to about 100 mesh, and this mixture is now used in compounding the enamel mix for smelting as follows:

| | Parts by weight |
|---|---|
| Mixture as above described | 33.30 |
| Sodium zirconium silicate (B) | 7.15 |
| Quartz | 40.47 |
| Borax | 26.53 |
| Sodium carbonate | 13.56 |
| Sodium nitrate | 2.50 |
| | 123.51 |

This charge can now be mixed in the usual manner and introduced into the smelter with the result that it smelts down readily with no troublesome titanium clots and requires a much shorter time period in the smelter so that economy is accomplished by way of fuel saving as well as in resulting greater furnace output, and in addition the best results are obtained as to enamel quality such as whiteness of color and intensity of opacity in the glass.

Definite advantages in whiteness and opacity are gained by including all or nearly all the calcium, fluorine and antimony compounds along with the titanium in the special mix first formed.

The following Example C will serve to show my improved methods in producing a clear glaze of acid resisting type. I will first set forth the complete raw mix formula with the calculated melted composition and then a suitable special mix containing the titanium along with part of the other materials introduced into this special mix.

| Raw mix | | Percentage melted composition | |
|---|---|---|---|
| | Parts by weight | | Percent |
| Quartz | 39.75 | Na₂O | 15.27 |
| Borax | 27.00 | BaO | 18.65 |
| Sodium carbonate | 15.70 | ZnO | 5.02 |
| Sodium nitrate | 4.17 | B₂O₃ | 10.01 |
| Titanium oxide | 10.64 | SiO₂ | 40.26 |
| Barium carbonate | 23.70 | TiO₂ | 10.79 |
| Zinc oxide | 4.96 | | |
| | | | 100.00 |
| Raw weight, total | 125.92 | | |
| Theoretical melted weight | 98.71 | | |

In this case I prefer to make up my mix as follows:—

| | Parts by weight |
|---|---|
| Titanium oxide | 10.64 |
| Zinc oxide | 4.96 |
| Barium carbonate | 2.00 |
| Quartz | 3.00 |
| Sodium carbonate | 5.00 |
| Borax | 5.00 |
| Sodium nitrate | 1.00 |
| | 31.60 |

I mix these materials roughly and then put through a disintegrating machine to production of an intimately mixed fine powder as heretofore described, and then proceed as follows:—

| | Parts by weight |
|---|---|
| Special mix | 31.6 |
| Quartz | 36.75 |
| Borax | 22.00 |
| Sodium carbonate | 10.70 |
| Sodium nitrate | 3.17 |
| Barium carbonate | 21.70 |
| Raw weight, total | 125.92 |

The result is an easier smelting mix in which the titanium compounds are in such form as to be allowed to exert their fluxing as well as acid resisting effects in the shortest period of smelting time.

The relative quantity of the special mix containing the titanium compounds to be introduced into the main batch to form the enamel frit for use in producing acid resisting vitreous enamels may be varied and may be readily ascertained by those skilled in enameling so as to attain the best results.

I claim as my invention:

1. In the method of producing a frit for acid-resisting vitreous enamels, the steps which comprise separately premixing finely-divided titanium compounds with part of the fusible enamel ingredients to form a mixture pulverized to about 100 mesh, the titanium content being from 32 to 42% of the mixture, then adding this mixture so formed to a raw batch of enameling materials in the proportion of about 1:4, and then smelting the charge to form said enamel frit.

2. In the method of producing a frit for acid-resisting vitreous enamels by the smelting of a raw batch of enameling materials, the step which consists in adding to this raw batch before smelting a finely-milled mixture of fusible enamel ingredients in the following proportions parts by weight: titanium oxide 14.0; quartz 0.5; borax 0.8; sodium carbonate 4.0; sodium nitrate 1.0; antimony oxide 7.0; and fluorspar 6.0.

3. In the method of producing a frit for acid-resisting vitreous enamels, the step which comprises separately premixing finely-divided titanium compounds with part of the fusible enamel ingredients to form a mixture pulverized to about 100 mesh, said mixture to be used for compounding with an enamel mix for smelting to form said frit.

4. In the method of producing a frit for acid-resisting vitreous enamels, the step which comprises separately premixing finely-divided titanium compounds with part of the fusible enamel ingredients to form a mixture pulverized to about 100 mesh, the titanium content being from 32% to 42% of the mixture, said mixture to be used for compounding with an enamel mix for smelting to form said frit.

5. A readily fusible finely-milled enameling composition for introducing into a raw batch of enameling materials to produce upon smelting a frit for acid-resisting vitreous enamels which comprises the following ingredients parts by weight: titanium oxide 14.0; quartz 0.5; borax 0.8; sodium carbonate 4.0; sodium nitrate 1.0; antimony oxide 7.0; and fluorspar 6.0.

6. A readily fusible finely-milled enameling composition for introducing into a raw batch of enameling materials to produce upon smelting a frit for acid-resisting vitreous enamels which comprises the following ingredients parts by weight: titanium oxide 14.0; quartz 0.5; borax 0.8; sodium carbonate 4.0; sodium nitrate 1.0; antimony oxide 7.0; and fluorspar 6.0, said ingredients being mixed and pulverized to about 100 mesh.

CHARLES J. KINZIE.